Feb. 3, 1959  H. J. THOMA  2,871,798
HYDRAULIC POWER TRANSMISSIONS
Filed Dec. 7, 1955

INVENTOR.
HANS J. THOMA
BY *A. A. Wicke*
Attorney

United States Patent Office 2,871,798
Patented Feb. 3, 1959

2,871,798

HYDRAULIC POWER TRANSMISSIONS

Hans Johannes Thoma, Zurich, Switzerland

Application December 7, 1955, Serial No. 551,618

9 Claims. (Cl. 103—162)

This invention relates to hydraulic power transmissions such as those of the type comprising a fluid pressure energy translating device which may function as a pump or as a fluid motor.

A form of construction in which the present invention is applicable is the axial piston, rotating cylinder block type of device which comprises a rotatable shaft with attached driving flange which flange operates pistons in a cylinder block as through articulated connecting rods, and more particularly to such devices in which the shaft and driving flange are journaled in a hemispherical cradle in thrust bearing relation to a spherical surface on the member which carries the rotating cylinder. Said member may therefore be rocked relative to the shaft and driving flange to vary the stroke of the pistons in the cylinder bores.

In such constructions it has been found that the friction between the spherical surfaces is excessive so that regulation of stroke is difficult and the ensuing wear is excessive. Merely supplying pressure oil between the spherical surfaces has been found unsatisfactory because the results obtained varied from unit to unit for some unknown reason. It has been found that this is due to infinitely small variations in construction of the spherical surfaces. It is therefore not possible to assure a parallel oil-filled space between the surfaces and the actual form of the space is dependent upon small errors in manufacture. If, for example, the two spherical surfaces should accidentally be in metallic contact with each other at the point of oil supply, whereas the balance of the spherical surfaces may be separated from each other by as little as .0001 inch, the oil pressure field can spread from the point of application only a very short distance so that neither friction nor wear would be substantially reduced. If, on the other hand, the spherical surfaces happen to be so formed as to provide a space between the surfaces adjacent to the point of pressure oil supply, the pressure field may expand so far that the surfaces are pressed apart, causing substantial leakage.

It is an object of the present invention to provide in such devices means for supplying pressure oil between the spherical surfaces over a limited but definitely defined constant area so that a pressure field of adequate but limited area may be definitely attained and maintained during the life of the machine.

Another object is to provide means which will assure that any metal or metallic oxide particles loosened from the surfaces or foreign matter carried between the surfaces by the oil may be washed away so that the surfaces are kept smooth and their smoothness even increased during use in spite of the large forces between the gliding surfaces resulting from the large piston thrust forces.

Another object is to provide throttling means in the pressure oil connection to control the flow of oil to the space between the surfaces.

Another object is to provide a valve with a movable valve body as such a throttling means.

Another object is to provide such a valve having a movable valve body or ball oscillatable between two seats, one of which is a sealing seat to provide a check valve and the other of which is non-sealing so as to permit a throttled flow of pressure oil.

Another object is to provide two such valves connecting with the oil delivery-intake passages, respectively, so that proper operation is effected when the pressure is reversed in said passages.

Another object is to provide a connecting passage between said valves.

A further object is to provide drainage grooves in one of the spherical surfaces to limit definitely the area of the pressure field or fields.

Other objects will appear from the following description of illustrative embodiments of the invention taken together with the attached drawings wherein.

Referring to said figures, Z represents the rotating cylinder block with pistons K working therein. Said cylinder block bears against the valve surface ST having the usual segmental ports communicating respectively with passages $D_1$ and $D_2$ leading to the hollow journals SZ swingably mounted in the housing H. The drive shaft TW has connected thereto drive flange TF provided with seats for receiving the ball ends of connecting rods P. The drive shaft together with the drive flange are journaled in the more or less hemispherical cradle KW whose hemispherical outer surface bears against a corresponding internal hemispherical surface in the dome KC which forms an extension of the cylinder block supporting member X within which the fluid channels $D_1$ and $D_2$ and the hollow journals SZ are formed. It will be noted that with this form of construction the forces resulting from the connecting rod thrust are not supported by the swinging journals SZ but by the dome KC, thus relieving said journals of the connecting rod thrust forces.

Figure 1:
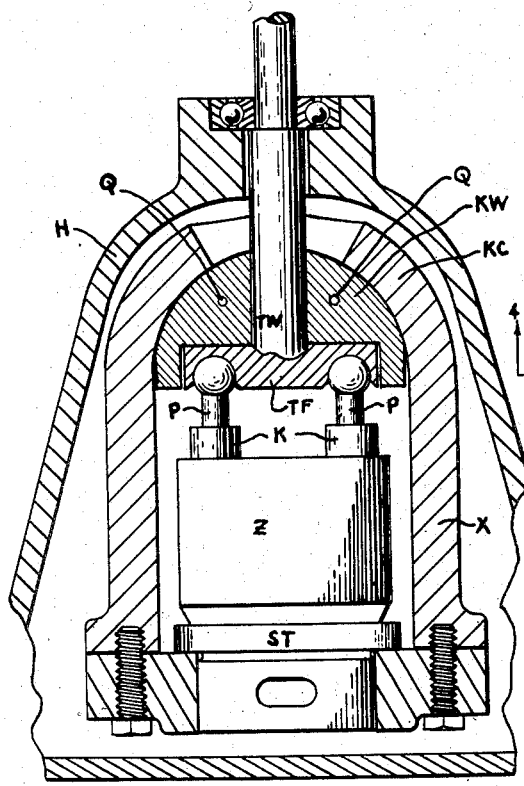
Fig. 1 is a view of an embodiment in which the driving flange, the rotating cylinder block support and the housing are shown in cross section.
Figure 2:
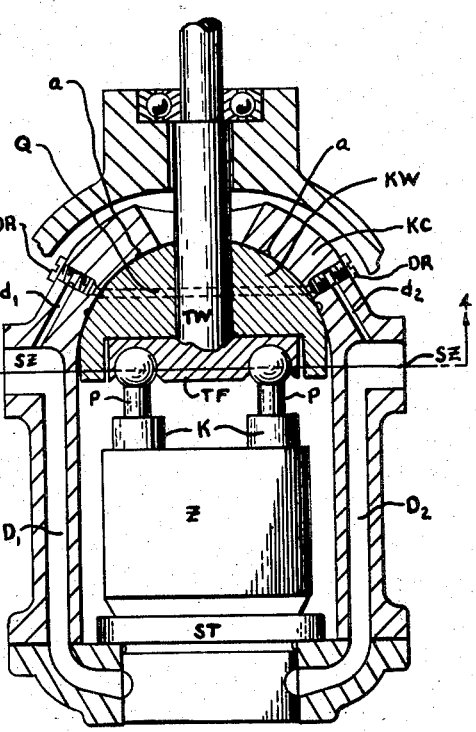
Fig. 2 is a view similar to Fig. 1 taken at right angles thereto, the housing being omitted.
Figure 3:
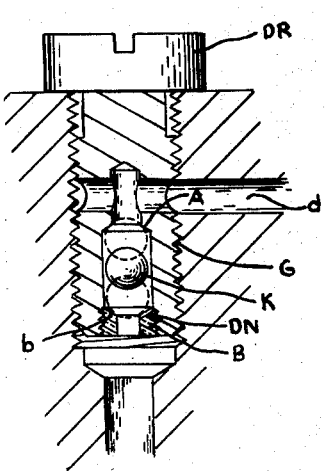
Fig. 3 is a fragmentary view showing the combination check and throttling valve.

In order to make the friction between the dome KC and cradle KW uniform, without eliminating it entirely, pressure oil channels $d_1$ and $d_2$ are provided connecting with channels $D_1$ and $D_2$. DR comprise throttling unit valves threaded into the dome KC and have an opening leading to the space between the spherical surfaces. Valves DR are preferably constructed in accordance with the principles shown more fully in Fig. 3. The shank G thereof is externally screw-threaded as shown, and provided with a central bore providing a check valve seat A. A cross bore in said shank G provides communication from $d_1$ (or $d_2$) to the central bore. At its lower end the said central bore is threaded internally to receive a collar B forming a seat $b$, which seat is preferably provided with one or more throttling grooves DN. Located between said seats A and $b$ is a valve member in the form of the ball K. Thus when pressure is applied below the ball it will rise against seat A and prevent reverse flow. When, however, pressure is applied above the ball through $d$, the ball K will rest on seat $b$, but a definitely limited throttled flow can take place through the throttling groove DN. If desired, the threads on collar B may be sufficiently loose to provide a throttling groove for pressure oil from passage $d$ to the space between the spherical surfaces. It will be seen that if high pressure exists in conduit $d_1$, oil will flow under throttled conditions into the space between the spherical surfaces in the vicinity of valve member DR on the same side. Flow through channels Q will lubricate the space at the other side but said oil cannot flow away through the valve member DR which connects with channel $d_2$, because the ball K has moved upwardly and prevented such flow. If pressure conditions are reversed the action of the valves is also reversed.

Figure 4:
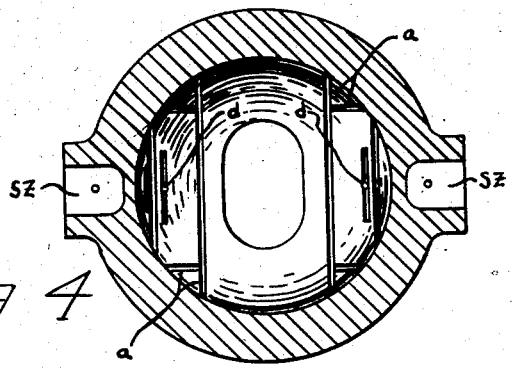
Fig. 4 is a cross-sectional view taken along the line 4—4 of Fig. 2 with certain parts omitted.

It is further desirable to provide a definite limit to the oil pressure field or fields, which may be accomplished by the drain grooves $a$ (Fig. 4). Thus the pressure oil flowing in through one of the valve members DR can build up a pressure field of only definitely limited area, namely the area surrounded by said grooves $a$.

While the complementary surfaces on the members KW and KC have been referred to as spherical, it will be apparent that the desired relative motion between these parts is primarily about an axis through SZ, SZ and that therefore any surface of revolution may suffice, such as a cone or cylinder, in place of the spherical form shown and described.

It will be noted that the constructions shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow.

I claim:

1. In a fluid pressure energy translating device having a cylinder block having a plurality of cylinder bores, pistons reciprocable in said bores, a rotatable operating member connected to said pistons, a support in which said operating member is journaled and a second support against which the first support bears, the said supports being each formed with a surface of revolution complementary to the other surface and swingable relatively to each other, said second support serving to support said cylinder block, together with a source of fluid under pressure and a conduit connected with said source and connected to conduct fluid under pressure between said complementary surfaces, said conduit including valve means constructed to permit a limited flow in one direction and constructed to prevent flow in the opposite direction.

2. In a fluid pressure energy translating device having a cylinder block having a plurality of cylinder bores, pistons reciprocable in said bores, a rotatable operating member connected to said pistons, a support in which said operating member is journaled and a second support against which the first support bears, the said supports being each formed with a surface of revolution complementary to the other surface and swingable relatively to each other, said second support serving to support said cylinder block, together with a source of fluid under pressure and a conduit connected with said source and connected to conduct fluid under pressure between said complementary surfaces, said conduit including a passage having oppositely facing valve seats, a valve member therein adapted to engage either seat, one of said seats being formed for sealing engagement with said valve member and the other being formed for non-sealing engagement with said valve member whereby limited flow occurs in one direction and flow in the other direction is prevented.

3. In a fluid pressure energy translating device having a cylinder block having a plurality of cylinder bores, pistons reciprocable in said bores, a rotatable operating member connected to said pistons, a support in which said operating member is journaled and a second support against which the first support bears, the said supports being each formed with a surface of revolution complementary to the other surface and swingable relatively to each other, said second support serving to support said cylinder block, together with a source of fluid under pressure and a conduit connected with said source and connected to conduct fluid under pressure between said complementary surfaces, said conduit including two valves one connected to a conduit containing fluid under pressure while the other is connected to a conduit under lower pressure, said valves each having two valve seats and each having a valve member which is adapted to engage either seat, one of each pair of seats being formed for sealing engagement with its valve member and the other of each pair of seats being formed for non-sealing engagement with its valve member, whereby oil under pressure will pass with throttled flow through one of said valves while the other valve prevents exit of said oil.

4. The combination according to claim 3 together with a passage leading from the vicinity of the exit portion of one of said valves to the vicinity of the exit portion of the other valve.

5. In a fluid pressure energy translating device having a cylinder block, a plurality of cylinder bores therein, pistons reciprocating in said bores, a rotatable operating member connected to said pistons, a support in which said operating member is journaled and a second support against which the first support bears, the said supports being each formed with a surface of revolution complementary to the other surface and swingable relatively to each other, said second support serving to support said cylinder block, together with a source of fluid under pressure and a conduit connected with said source and connected to conduct fluid under pressure between said complementary surfaces to a limited area in one section of said surfaces, a second conduit receiving fluid from a pressure source and conducting said fluid under pressure to a limited area in another section of said surfaces, and a connecting conduit connecting said limited areas.

6. The combination according to claim 5, together with a check valve in each of said fluid supply conduits.

7. The combination according to claim 5, together with flow restricting means in each of said fluid supply conduits.

8. The combination according to claim 5, together with a flow control valve in each of said fluid supply conduits, each of said valves comprising two valve seats and each having a valve member which is adapted to engage either seat, one of each pair of seats being formed for sealing engagement with its valve member and the other of each pair of seats being formed for non-sealing engagement with its valve member, whereby oil under pressure will pass with throttled flow through one of said valves while the other valve prevents exit of said oil.

9. In a fluid pressure energy translating device having a cylinder block, a plurality of cylinder bores therein, pistons reciprocating in said bores, a rotatable operating member connected to said pistons, a support in which said operating member is journaled and a second support against which the first support bears, the said supports being each formed with a surface of revolution complementary to the other surface and swingable relatively to each other, said second support serving to support said cylinder block, together with a source of fluid under pressure and a conduit connected with said source and connected to conduct fluid under pressure between said complementary surfaces to a limited area in one section of said surfaces and an extension conduit receiving fluid from said first mentioned conduit and conducting fluid under pressure to a limited area in another section of said surfaces, together with flow restricting means in said first mentioned conduit.

References Cited in the file of this patent

UNITED STATES PATENTS

| 848,618 | Anson | Apr. 2, 1907 |
| 851,999 | Skellenger | Apr. 30, 1907 |
| 1,362,040 | Pratt | Dec. 14, 1920 |
| 2,155,455 | Thoma | Apr. 25, 1939 |
| 2,463,299 | Nixon | Mar. 1, 1949 |

FOREIGN PATENTS

| 403,697 | Italy | May 5, 1943 |
| 809,629 | Germany | Aug. 2, 1951 |
| 820,242 | Germany | Nov. 8, 1951 |